(12) United States Patent
Surendran et al.

(10) Patent No.: US 8,458,168 B2
(45) Date of Patent: Jun. 4, 2013

(54) ANTICIPATING INTERESTS OF AN ONLINE USER

(75) Inventors: Arungunram C. Surendran, Sammamish, WA (US); Ying Li, Bellevue, WA (US); Flavia Silvana Moser, Vancouver (CA); Martin Ester, Burnaby (CA)

(73) Assignee: Microsoft Corporation, Redmond, WA (US)

( * ) Notice: Subject to any disclaimer, the term of this patent is extended or adjusted under 35 U.S.C. 154(b) by 214 days.

(21) Appl. No.: 12/412,921

(22) Filed: Mar. 27, 2009

(65) Prior Publication Data
US 2010/0250529 A1 Sep. 30, 2010

(51) Int. Cl.
*G06F 17/30* (2006.01)

(52) U.S. Cl.
USPC .......................................... 707/722

(58) Field of Classification Search
USPC .......................................... 707/732
See application file for complete search history.

(56) References Cited

U.S. PATENT DOCUMENTS

| | | |
|---|---|---|
| 2003/0040850 A1 | 2/2003 | Njmi |
| 2003/0101449 A1 | 5/2003 | Bentolila |
| 2006/0262115 A1 | 11/2006 | Shapiro |
| 2007/0136457 A1 | 6/2007 | Dai |
| 2007/0260596 A1 | 11/2007 | Koran |
| 2008/0005079 A1* | 1/2008 | Flake et al. .................. 707/3 |
| 2008/0052152 A1 | 2/2008 | Yufik |
| 2008/0071740 A1* | 3/2008 | Jhala et al. .................. 707/3 |
| 2008/0082518 A1* | 4/2008 | Loftesness .................. 707/5 |
| 2008/0114751 A1 | 5/2008 | Cramer |
| 2008/0222170 A1 | 9/2008 | Farnham |
| 2008/0276270 A1 | 11/2008 | Kotaru |
| 2009/0077047 A1* | 3/2009 | Cooper et al. ............... 707/4 |
| 2009/0112701 A1* | 4/2009 | Turpin et al. ............... 705/10 |
| 2009/0192871 A1* | 7/2009 | Deacon et al. .............. 705/10 |

OTHER PUBLICATIONS

Boldi et al., "The Query-flow Graph: Model and Applications", Oct. 2008, ACM.*

Tessa Lau and Eric Horvitz "Patterns of Search: Analyzing and Modeling Web Query Refinement," Department of Computer Science & Engineering, University of Washington, Seattle, WA, USA, Decision Theory & Adaptive Systems, Microsoft Research, Redmond, WA, USA, 10 pages, http://www.cs.usask.ca/UM99/Proc/lau.pdf.

John H. Roberts, Australian Graduate School of Management, University of New South Wales, Kensington, NSW, Australia 2033, Gary L. Lilien, Pennsylvania State University, 113 BAB 11, University Park, PA 16802 USA, "Explanatory and Predictive Models of Consumer Behavior," Some of the material in this paper, prepared by the same authors, also appears in Chapter 2 of Lilen, Kotler & Moorthy [1992], Marketing Models (Prentice-Hall, Englewood Cliffs), J. Eliashberg and G.L. Lilen, EDS, Handbooks in OR & MS, vol. 5, 1993 Elsevier Science.

(Continued)

*Primary Examiner* — Hung Q Pham
(74) *Attorney, Agent, or Firm* — Shook, Hardy & Bacon LLP

(57) ABSTRACT

Methods, systems, and computer-readable media for identifying intentions related to a user's present intention are provided. The user's present intention may be determined by mapping the user's current actions to a present intent. A related intent may be determined using an intent chain. The intent chain may be generated by analyzing patterns of user activities and mapping the patterns of activities to the underlying intents.

20 Claims, 9 Drawing Sheets

OTHER PUBLICATIONS

Cunjun Huang, Pradip Sheth, Alexandre Ledoux, University of Virginia, Department of Mechanical and Aerospace Engineering, Glenn Wasson, University of Virginia, Computer Science Department, Majd Alwan, University of Virginia, Medical Automation Research Center, "Shared Navigational Control and User Intent Detection in an Intelligent Walker," 8 pages, http://marc.med.virginia.edu/pdfs/library/FS205AlwanM2.pdf.

* cited by examiner

ANTICIPATING INTERESTS OF AN ONLINE USER

BACKGROUND

Currently, advertisements may be presented based on a direct match between keywords and concepts in online content and keywords and concepts associated with an advertisement. Examples of online content include web pages, videos, and search queries. The presented advertisements are likely to be directly related to the subject matter of the present online content.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the invention generally relate to determining a user's present intentions based on observation of online activities (e.g., web sites visited, query submissions). A chain of intent is used to determine an intent that is related to the present intent. An online object (e.g., an advertisement, query help, query result) associated with the related intent may be selected and displayed to the user. A chain of intent is a sequence of two or more intents. For example a present intent to research a car may be related through a chain of intent to the intent to buy a car, and/or the intent to buy car insurance. Thus, upon determining that the user's present intention is "to buy a car" and this intent is related to the intention to buy car insurance, an online object, such as an advertisement for car insurance, may be displayed to the user.

BRIEF DESCRIPTION OF THE DRAWINGS

Embodiments of the invention is described in detail below with reference to the attached drawing Figures, wherein.

DETAILED DESCRIPTION

Figure 1:
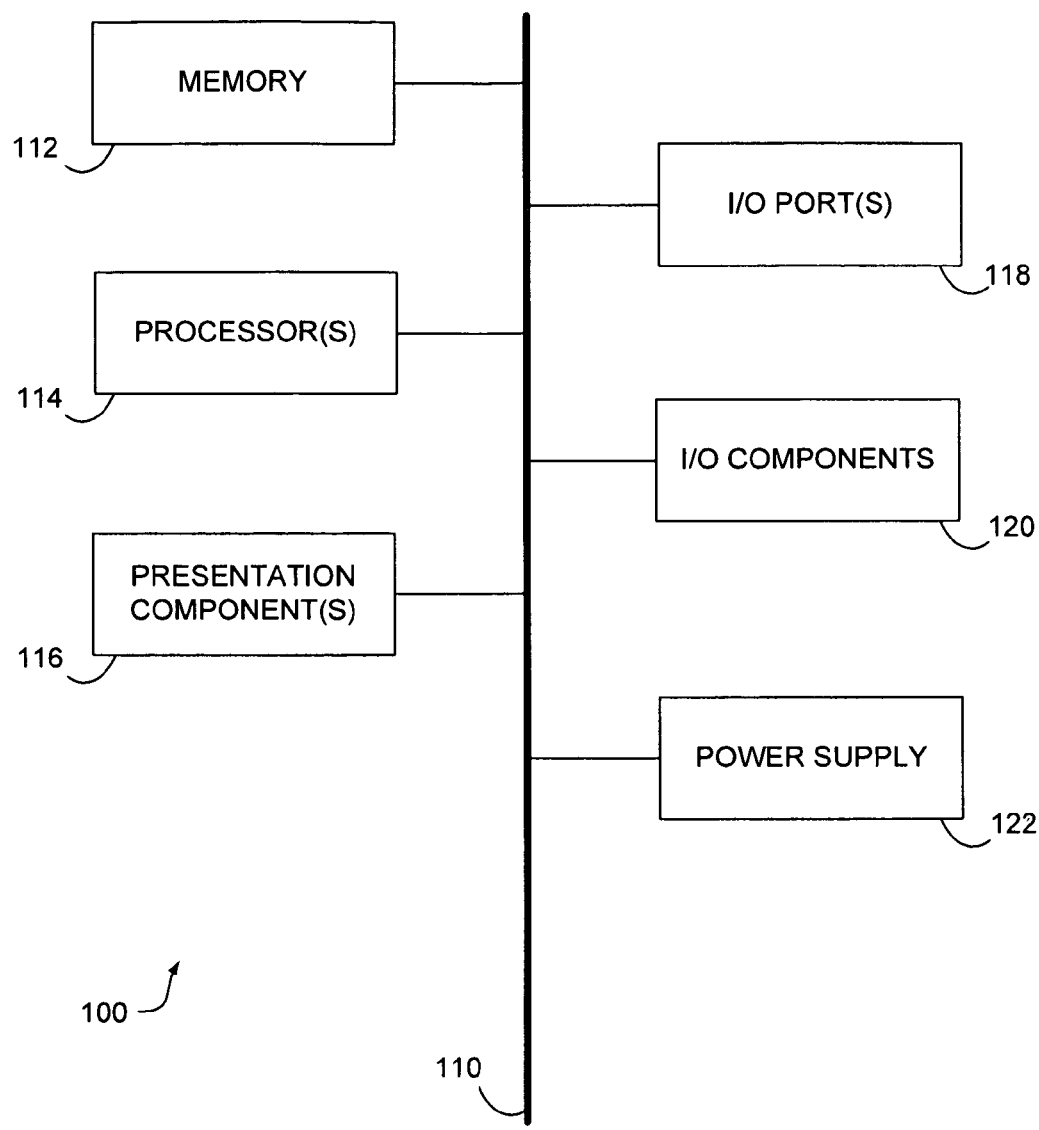
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the invention are generally related to presenting online objects (e.g., an advertisement, query help, query result) to a user in anticipation of the user having an intent associated with the online objects. The online objects may not be directly related to a present intent manifested by the user's present actions. By anticipating a future intent related to the present intent or an adjacent intent related to the present intent the online objects displayed to the user may contain an element of pleasant surprise or serendipity. In other words, the user may not have a conscious intention associated with the online objects, but the online objects may be associated with a related intention so that the user is, nevertheless, interested in the online objects.

A user's intent is the object logically accomplished by performing an online action. For example, the user visiting a web site (i.e., the online action) containing used car prices accomplishes the object of learning about used car prices. Embodiments of the invention may presume the user performed the online action with the intent to accomplish the object logically related to the online action. The user's related intention may be ascertained by determining a user's present intentions based on observation of the users current online activities (e.g., web sites visited, query submissions). A chain of intent is used to determine a related intent that is associated with the present intent. An online object associated with a related intent may be selected and displayed to the user. A chain of intent is a sequence of two or more related intents. For example, a present intent to research a car may be related to the intent to buy a car and/or to buy car insurance. Thus, upon determining that the user's present intention to buy a car is related to the intention to buy car insurance, an online object, such as an advertisement for car insurance, may be displayed to the user.

Accordingly, in one embodiment, one or more computer-readable media having computer-executable instructions embodied thereon for performing a method of determining an intent that is related to a present intent of the user, wherein the present intent is manifested through one or more actions performed by the user. The method includes receiving the one or more actions performed by the user. The method also includes determining a present intent for the user based on the one or more actions, wherein the present intent is one of a plurality of intents within an intent ontology that defines relationships between intents and actions. Each of the intents within the plurality of intents is associated with at least one other intent through a chain of intent, wherein the chain of intent includes a sequence of two or more related intents. The method also includes selecting a related intent that is part of a specific chain of intent of which the present intent is also a part. The method further includes retrieving an online object that is associated with the related intent.

In another embodiment, a computerized system, including one or more computer-readable media, for finding relationships between intents ascertained from online user actions. The system includes an activity data store containing a plurality of online actions, wherein each online action is associated with an individual user. The system includes an intent-association component that identifies chains of intent, which include two or more related intents, by analyzing sequences within the plurality of online actions. Each of the plurality of online actions may be associated with one or more user intents. A user's intent is the object logically accomplished by performing a particular online action. The system also includes an intent-ontology data store that stores an intent ontology that defines associations between online actions and user intents and a chain-of-intent data store that stores the chains of intent identified by the intent-association component.

In yet another embodiment, a computerized method for presenting advertising objects that are related through an intent chain to an intent ascertained from observed online actions performed by a user. The method includes building a chain-of-intent data store that stores relationships between a plurality of intents. Each of the intents within the chain-of-intent data store is related through a chain of intent to at least one other intent. The method further includes receiving one or more online actions presently performed by the user. The method also includes determining that the user has a present intent based on the one or more online actions. The method further includes retrieving a related intent that is part of a specific chain of intent of which the present intent is also a part. The specific chain of intent is part of the chain-of-intent data store. The method also includes retrieving an advertising object that is associated with the related intent, but not the present intent. The method further includes displaying the advertising object to the user.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120t. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-storage media. By way of example, and not limitation, computer-readable media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices; or any other medium that can be used to encode desired information and be accessed by computing device 100.

Memory 112 includes computer-storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary System Architecture

Figure 2:
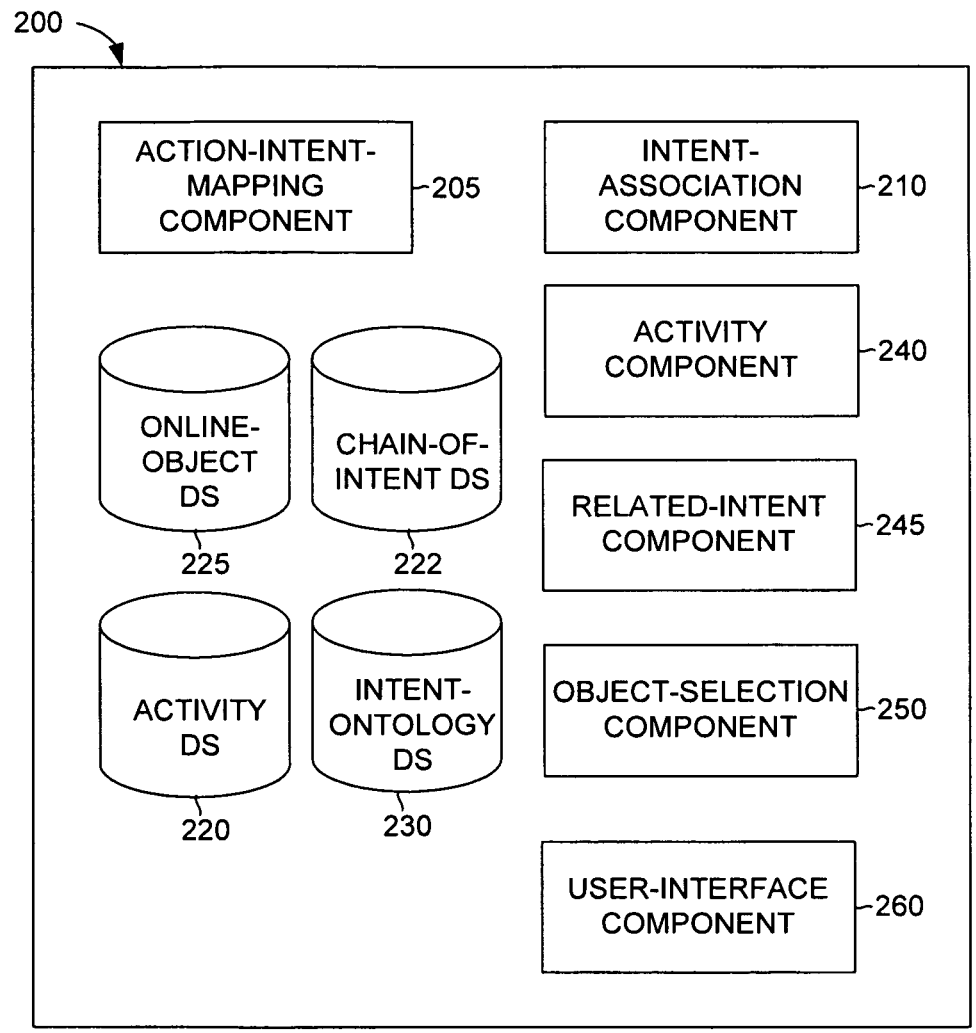
FIG. 2 is a block diagram of an exemplary computing system suitable for implementing embodiments of the invention.

Turning now to FIG. 2, a block diagram is illustrated that shows an exemplary computing system architecture 200 suitable for implementing embodiments of the present invention. It will be understood and appreciated by those of ordinary skill in the art that the computing system architecture 200 shown in FIG. 2 is merely an example of one suitable computing system and is not intended to suggest any limitation as to the scope of the use or functionality of embodiments of the invention. Neither should the computing system architecture 200 be interpreted as having any dependency or requirement related to any single component/module or combination of components/modules illustrated therein.

Computing system architecture 200 includes an action-intent mapping component 205, an intent-association component 210, an activity data store 220, a chain-of-intent data store 222, an online-object data store 225, an intent-ontology data store 230, an activity component 240, a related-intent component 245, an object-selection component 250, and a user interface component 260. Computing system architecture 200 may reside on a single computing device, such as computing device 100 shown in FIG. 1. Alternatively, computing system architecture 200 may reside in a distributed computing environment that includes multiple computing devices (e.g., servers, clients) coupled with one another via one or more networks. Such networks may include, without limitation, one or more local area networks (LANs) and/or one or more wide area networks (WANs). Such network environments are commonplace in offices, enterprise-wide computer networks, intranets, and the Internet. Accordingly, the network, or combination of networks, is not further described herein.

The action-intent mapping component 205 defines relationships between intents and user actions. The user actions may be online of offline. Online actions that may be mapped to one or more intents include navigating to a web site or entering a search query. Offline actions include making an airline or hotel reservation. A user's intent is the object logically accomplished by performing an action. For example, a user may navigate to a web page containing prices for used cars. The user's underlying intent for visiting the web page with used car prices may be to research car prices since that is the object accomplished by visiting the site. Similarly, a user entering a search query for a stock or a bond may intend to purchase an investment.

Some activities or actions are ambiguous and may be mapped to multiple intents. Further, multiple actions may be combined and mapped to a single intent. In addition, a single intent may be mapped to multiple actions. For example, visiting an investment website and a travel website could both be mapped to a general intent to spend money. As explained in more detail subsequently, intents may be organized in a hierarchy. For example, in the above example, an intent to spend money on travel and an intent to spend money on an investment could be branches of the of the root intent to spend money.

In one embodiment, a stochastic process is used to determine relationships between intents and actions. A Markov model is one example of a stochastic process that may used to find relationships between intents and actions. A Markov model processes sequences of activities performed by users to find intents associated with the actions. As explained in more detail subsequently, a Markov model may also be used by the intent-association component 210 to find relationships between intents. In one embodiment, the relationships between intents and actions and the relationships between different intents is determined by the same stochastic process. Once relationships between actions and intents are determined by the action-intent mapping component 205, the relationships may be stored in intent-ontology data store 230.

Once the relationships between intents and actions are stored, other components may determine a present action from a present intent or a present intent to a present action. In another embodiment, the action-intent mapping component 205 determines a present intent based on a present action and communicates the present intent to a separate component that requested the present intent. The action-intent mapping component 205 may use one or more classifiers to determine a present intent based on one or more present actions. In one embodiment, classifiers may be trained using training data generated by people. The training data is a compilation of actions and the intents that a group of people thought were related to each other. The classifier analyzes the training data to "learn" how to determine a present intent based on the actions. The classifier used by the action-intent component 205 may be a logistic regression or support vector machine ("SVM") classifier. Other types of classifiers may also be used. Including the classifier within the action-intent mapping component 205 is just one embodiment. The same, or different classifiers, may be a part of other components, such as the related intent component 245, which needs to know a present intent based on present actions. In another embodiment, the classifier is an independent component that is called or accessed by the action-intent component 205 and other components.

The intent-association component 210 generates chains of intent by identifying relationships between user intents. A chain of intent is a series to two or more related intents. A user's intent is the object logically accomplished by performing an online action. For example, a user may navigate to a web page containing prices for used cars. The user's underlying intent for visiting the web page with used car prices may be to research car prices. Similarly, a user entering a search query for a stock or a bond may intend to purchase an investment. The intent-association component 210 analyzes series of actions performed by a plurality of users to identify relationships between intents associated with those actions. As explained above, the relationships between actions and intents may be determined by the action-intent mapping component 205 and stored in the intent-ontology data store 230. In another embodiment, the relationships between the actions and the underlying intents may be determined by a programmer and recorded as part of an intent-ontology in the intent-ontology data store 230. The relationships between actions and intents allow the series of actions to be mapped to the underlying intents. As explained subsequently, a collection of actions performed by a plurality of users may be collected in the activity data store 220. When multiple users perform subsequent actions which can be mapped by 210 to the same sequence of intents, a relationship between these intents may be identified.

The intent-association component 210 may use various models to identify relationships between intents. The models could be an Association Rule Mining algorithm, or a stochastic process, such as a Markov Decision Process or a Hidden Markov Model. Any of these models may be used by the intent-association component 210 to identify relationships between intents. In general, each model can be used by the intent-association component 210 to analyze actions performed by multiple users to identify relationships between intents (e.g., chains of intent). The actions may be mapped to the intents in a separate process or the same process and recorded in an intent-ontology. Once relationships between intents are indentified, the intent-association component 210 may store the relationships in the chain-of-intent data store 222.

When the intent-association component 210 uses an Association Rule Mining algorithm, each online action first is mapped to a related intent. When intents consistently occur in sequence or in close temporal proximity to each other, a relationship may be formed between the intents. The more frequently a series of intents occur in the same order, the higher the associative probability between the intents. In one embodiment, only sequences of intents with an associative probability above a threshold percent are recorded in the chain-of intent data store 222. For example, the intent-association component 210 may determine that two intents with an associative probability above 10% have a relationship and form a chain of intent or part of a chain of intent.

A Hidden Markov Model is a statistical model in which the system being modeled is assumed to be a Markov process with unknown parameters. A Markov process is a process in which the subsequent state (intent) is assumed to be related only to the present state (intent). In a Markov process, previous actions and previous states are not utilized to determine a subsequent state. Only the present state is considered. Using a Hidden Markov Model, the intent-association component calculates the various probabilities of transitioning to a subsequent state. Each possible combination of states is given a transition probability. The intent-association component 210 may determine that state combinations with a transition probability above a threshold amount have a relationship to each other. The two intents form the first two parts of an intent chain. Additional parts may be added to the intent chain if the second state in the intent chain has a transition probability above a threshold amount with a third state. Other models may be used by the intent-association component 210 to model multiple state sequences that take into account previous actions and states in addition to the present state to improve the accuracy of intent chains with more than two states.

The intent-association component 210 using a Markov Decision Process utilizes both the present state and prior actions to determine a subsequent state. Utilizing both past actions and the present state to determine the subsequent state or states may improve the accuracy of the model. This is particularly true when the present observed online action is ambiguous. For example, querying "flowers" may demonstrate a present intent to garden or plan a romantic evening. If the subsequent action was to query "chocolates," then the present intent to plan a romantic evening is more likely. Similarly, a subsequent intent, for example, to investigate jewelry or restaurants will demonstrate a present intent to plan a romantic evening. Embodiments of the invention are not limited to utilizing the aforementioned models to identify intent sequences. Once intent sequences are determined, they may be stored in the chain-of-intent data store 222 that will be explained subsequently.

Figure 3:
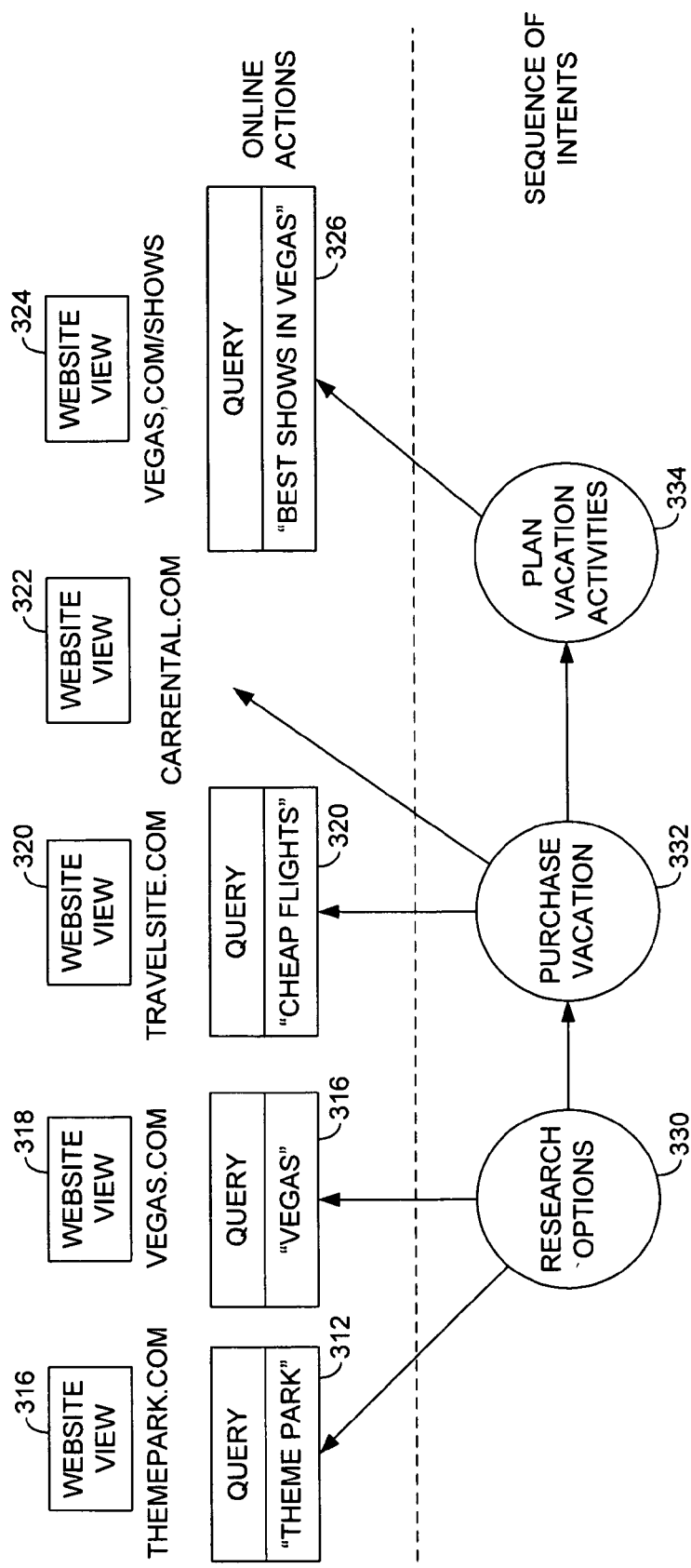
FIG. 3 illustrates how chains of intent may be derived from online actions in accordance with an embodiment of the invention.

FIG. 3 illustrates a series of online actions performed by a user and an associated sequence of underlying intents held by the user when performing the actions. These actions may be recorded in the activity data store 220 and analyzed by the intent-association component 210 to identify relationships between intents. The user navigates to "Themepark.com" 310, enters a query "Theme park" 312, navigates to a website "vegas.com" 314, and enters the query "Vegas" 316. Each of the aforementioned online actions may be associated with the user's intent to "research vacation options" 330. The relationship between the underlying intent to "research vacation options" 330 and the associated online actions are shown by arrows. In one embodiment, online actions are associated with underlying intents by programmers that store the associations in an intent-ontology. The intent-association component 210 may map the online actions to intents using the associations within the intent-ontology. The next intent in the sequence of intents is to "purchase a vacation" 332. The user manifests an intent to "purchase a vacation" 332 by navigating to "travelsite.com" 318, entering the query "cheap flights" 320, and navigating to "carrental.com" 332. Each of the online actions associated with the intent to "purchase a vacation" 332 lead to web sites where portions of the vacation may be purchased. The next intent in the sequence of intents is to "plan vacation activities" 334. The user manifests an intent to "plan vacation activities" by navigating to "vegas.com/shows" 324 and entering the query "best shows in Vegas" 326.

The sequence of intents in FIG. 3 has a logical chronological sequence. A person may first have the intent to "research vacation options" 330, "purchase a vacation" 332, and then "plan vacation activities" 334. An individual user could chose to pursue these activities in a different order, however, the intent sequences used in embodiments of the invention may ultimately be determined by a statistical analysis of online action patterns generated by multiple users. As explained in more detail subsequently, the statistical analysis may be performed by the intent-association component 210 using various models. Thus, the sequential order in a particular chain of intent may reflect the course of action followed by a threshold percentage (e.g. 20%) of users. If each of the online actions occurring in FIG. 3, or other similar actions mapping to the same intents, occurred in the sequence shown, then a chain of intent can be built with the three intents. Other chains of intent may be built from sequences of intents followed by lower percentages of users. The chain of intent illustrates that a user with the first intent is statistically likely to have the second and third intent in the chain of intents in the future. In embodiments of the invention, it may be desirable to present online objects, such as advertisements related to vacation activities, to a user when their present intent is to research vacation options in anticipation of a related intent to plan vacation activities.

Figure 4:
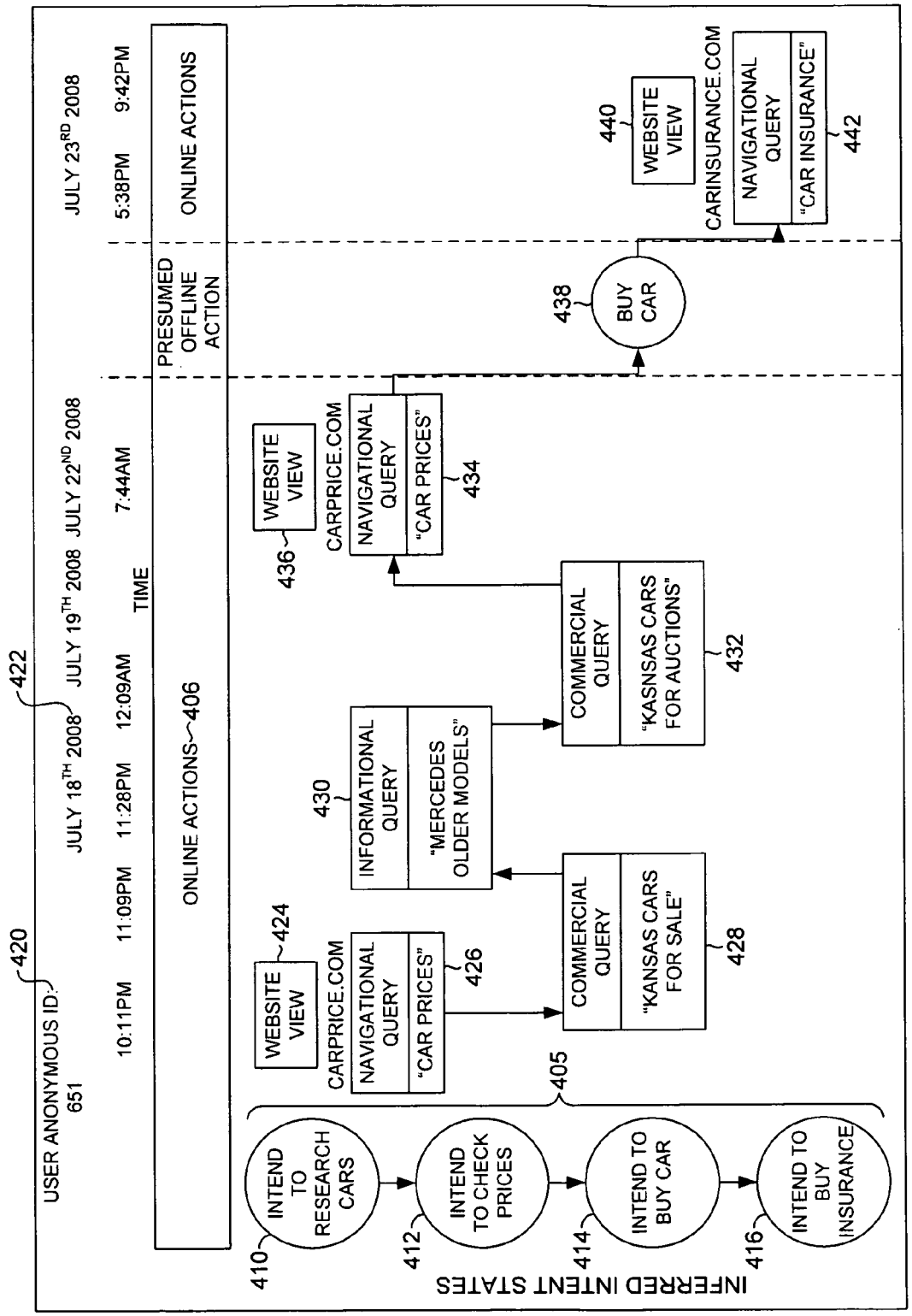
FIG. 4 illustrates how chains of intent may be derived from a temporal sequence of online actions in accordance with an embodiment of the invention.

FIG. 4 further illustrates how chains of intent may be derived from a chronological sequence of online actions. These actions may be recorded in the activity data store 220 and analyzed by the intent-association component 210 to identify relationships between intents. The chain of intent 405 includes an intent to "research cars" 410, an intent to "check prices" 412, an intent to "buy a car" 414, an intent to "buy car insurance" 416. The chain of intent 405 may be derived by evaluating the sequence of online actions 406 associated with each of the intents. In one embodiment, online actions are associated with underlying intents by programmers that store the associations in an intent-ontology. In another embodiment, the action-intent mapping component 205 may map the online actions to intents and store the relationships in an intent ontology.

The first two online actions occur at 10:11 p.m. on Jul. 18, 2008, as indicated in the time information section 422. It can also be seen that all of the online actions 406 are associated with a single anonymous user 420. The first two online actions, entering a query "car prices" 426 and navigating to "carprice.com" 424, correspond to the intent to "research cars" 410. The "carprice.com" website contains prices for new and used cars of various makes and models. The next online action, entering a query "Kansas cars for sale" 428 occurs at 11:09 p.m. on Jul. 18, 2008. This online action corresponds to an intent to "check prices" 412. The next online action, entering the query "Mercedes older models" 430 is associated with the intent to "research cars" 410. The next online action, entering the query "Kansas car auctions" 432 occurs at 12:09 a.m. on Jul. 19, 2008. This online action corresponds with an intent to "check prices" 412. The next two online actions are navigating to "carprice.com" 436 and querying "car prices" 434. Online actions 434 and 436 occur at 7:44 a.m. on Jul. 22, 2008, and correspond to the intent to research cars 410. The next online action is to enter a navigation query "Car insurance" 442 and to navigate to "Carinsurance.com.com" 440. Online actions 440 and 442 correspond to an intent to "buy car insurance" 416. FIG. 4 also shows a presumed offline activity of "buying a car" 438. In some cases, the offline activity may not be available, but may be presumed by the intent-association component 210. The offline activity of "buying a car" 438 corresponds with the intent to "buy a car" 414.

As explained subsequently, the chain of intent may fall in a sequential order even though, in a particular instance, a user may not strictly follow the chain of intent. For example, in FIG. 4 the user submits a query "Kansas cars for sale" 428 that corresponds to an intent to "check prices" 412 and then performs an online action that corresponds with a previous intent. The overall order of intents within the chain of intent may be based on probabilities calculated by the intent-association component 210 based on actions performed by multiple users. The actions taken by any one user may deviate from the sequence of intents recorded in a chain of intent. As will be explained subsequently, it may be desirable to show an advertisement associated with the intent to buy car insurance when a user has the present intent to research cars 410 and/or intent to check prices 412 in anticipation of having the related intention to "buy car insurance" 416.

Figure 5:
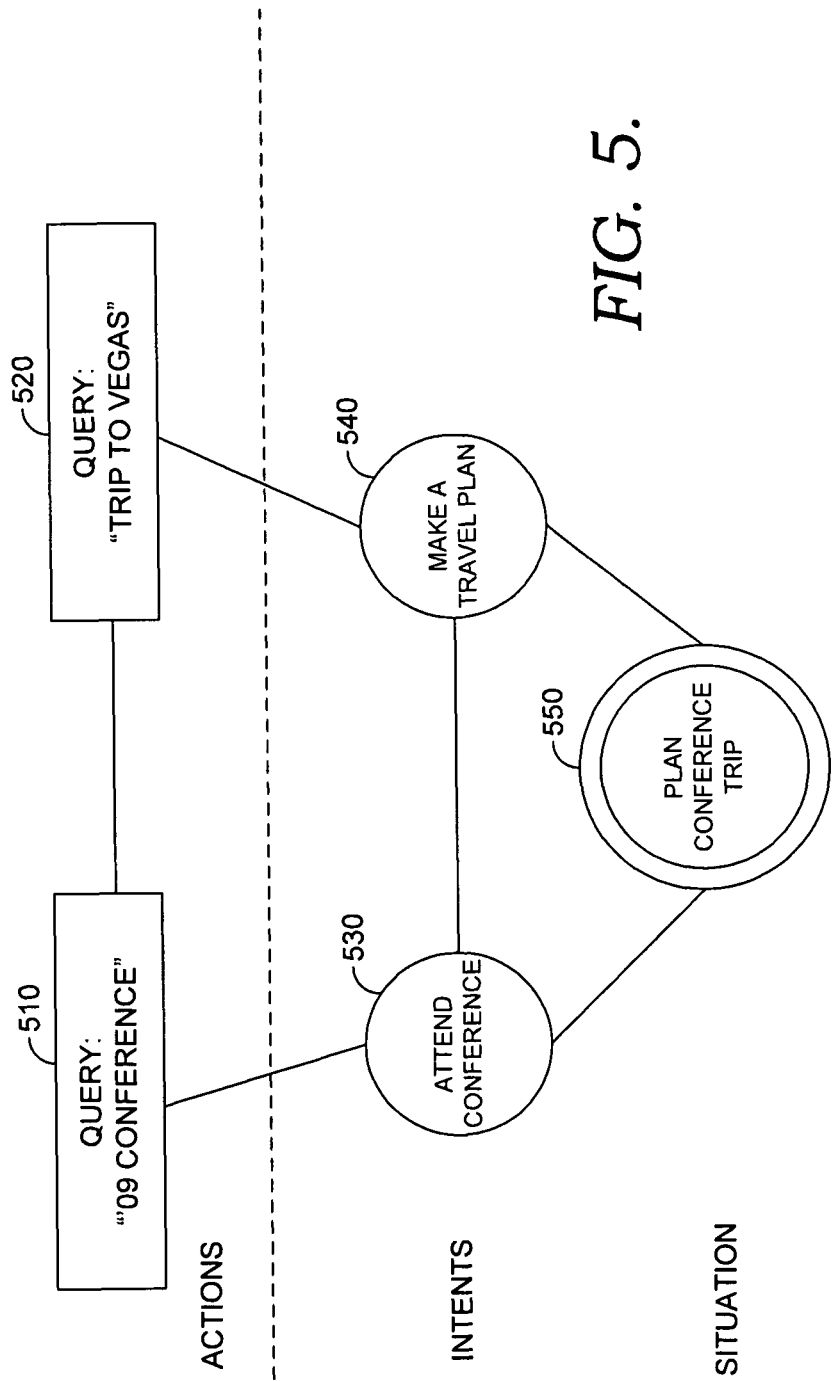
FIG. 5 illustrates a sequential chain of intent in accordance with an embodiment of the invention.
Figure 6:
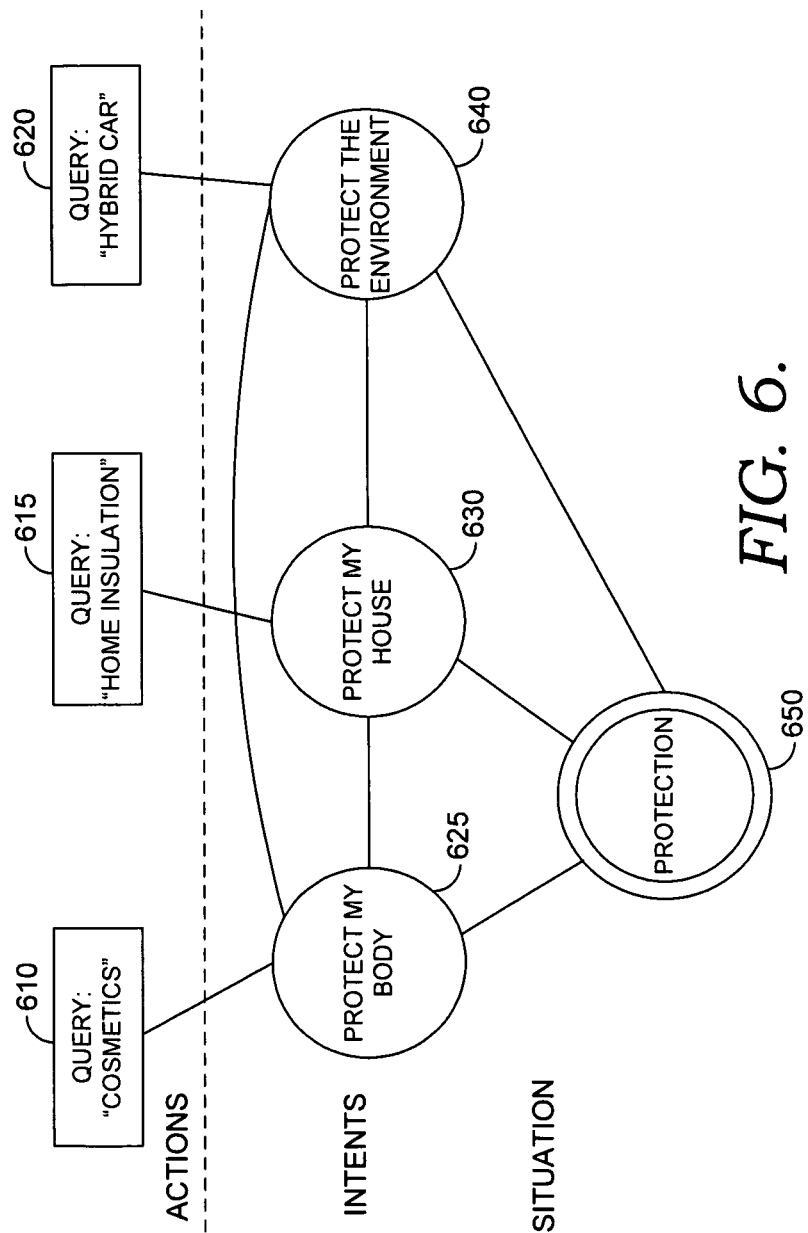
FIG. 6 illustrates a nonsequential chain of intent in accordance with an embodiment of the invention.

FIGS. 5 and 6 illustrate two types of intent relationships. FIG. 5 shows a chronological relationship between intents. FIG. 6 shows non-chronological relationships related to a common situation. In a chronological relationship, the related intent will follow the present intent. The user may not have the related intent until an action associated with the present intent is completed. In a non-chronological relationship, the user may have the two related intents simultaneously and the actions associated with the two related intents may not have a logical temporal order. The intent-association component 210 may identify intent associations that are chronological or non-chronological.

In FIG. 5, the first online action performed by a user is to query "2009 conference" 510. This online action is associated with the intent to "attend a conference" 530. As explained previously, the intent-association component 210 may determine which intent is associated with an online action by consulting a list of intent/online action associations in an intent-ontology. The subsequent intent (e.g., future intent) is to "make a travel plan" 540. The "make a travel plan" 540 intent is associated with the query "trip to Vegas" 520. In general, a user would have an intent to attend a conference before they would intent to make travel plans to attend the conference. Both the intent to "attend a conference" 530 and the intent to "make a travel plan" 540 are part of the situation to "plan a conference trip" 550. In both a chronological and non-chronological intent chain, the intents may be linked by a common situation.

FIG. 6 illustrates a non-chronological chain of intent. Each of the intents within the chain of intent is unified or related by a common situation, which in this case is a focus on "protection" 650. The first intent is to "protect my body" 625. The intent to "protect my body" 625 is associated with the online action to query "cosmetics" 610. As explained previously, the intent-association component 210 may determine which intent is associated with an online action by consulting a list of intent/online action associations in an intent-ontology. One purpose of cosmetics is to protect a person's skin. The intent to "protect my house" 630 is associated with the online action to query "home insulation" 615. The intent to "protect the environment" 640 is associated with the online query "hybrid car" 620. The three intents shown are not chronological. A person could think to "protect my house" 630 independently of either "protecting my body" 625 or "protecting the environment" 640. A person with the intent to "protect my house" 630 may have the more general intention to focus on protection in general, and thus, may simultaneously have multiple intentions related to protection.

Returning now to FIG. 2, the Activity data store 220 includes activities performed by users. Examples of activities include, but are not limited to, navigating to a web site, submitting a search query, purchasing an item, clicking on a link, and downloading an object. The activities in activity data store 220 may be used by the action-intent mapping component 205 to identify relationships between intents and activities. The activities in activity data store 220 may also be used by the intent-association component 210 to identify relationships between two or more intents that are associated with the activities. Descriptive information stored with individual activities includes a unique activity identification, a description of the activity, one or more keywords associated with the activity, date the activity was performed, and information describing the user that performed the activity. The online activities may be gathered by search engines, online advertisers, tool bars, and other methods. In an embodiment, the activity data store 220 may include millions of online activities associated with millions of different users. The activity data store 220 may be in the form of a data base or any other form capable of storing summaries of activities and associated data. The activity data store 220 includes an interface that allows other components of computing system architecture 200 to access the information in activity data store 220.

The offline actions in activity data store 220 may include making a purchase, taking a trip, watching a TV show, or downloading a movie The offline actions may be received from entities such as travel agents, cable companies, and retailers. For example, a cable company may supply information indicating that a user watched a show on home improvements. This might support a present intent to research home improvements. Other online actions may also be received. The online actions may include visiting a web site, downloading an article, watching a video online, and submitting a search query.

Online-object data store 225 includes online objects that may be presented to users or help other components select an object to present to the user. Examples of online objects include, but are not limited to, query results, advertisements, web links, and query help. The online-objects may also include a cookie that identifies and advertising segment and may be uploaded to a user's computing device. Advertisers may use the cookie to select ads related to the ad segment indicated in the cookie. The online objects in online-object data store 225 may be retrieved by the object-selection component 250 and displayed by the user-interface component 260. The online-object data store 225 includes an interface that allows other components of computing system architecture 200 to access the information in online-object data store 225.

The chain-of-intent data store 222 stores chains of intent that may be generated by intent-association component 210. The chains of intent within the chain-of-intent data store 222 include two of more related intents. The relationships between the intents within a given chain of intent may be one-way or bidirectional. For example, an intention to research cars may be related to an intention to purchase a car. This would be a one-way relationship because it would not make sense to have an intention to purchase a car and then research the car purchase after making it. On the other hand, as in the protection illustration of FIG. 6, the relationships between the intents could be bidirectional. In other words, a person having an intent to "protect my body" 625 may also have an intent to "protect the environment" 640. Similarly, a person with the intent to "protect the environment" 640 could also have the intent to "protect my body" 625. The order of these intents is bidirectional. In one embodiment, the chain-of-intent data store 222 is part of the intent-ontology data store 230.

A unidirectional relationship may be artificially imposed within a chain of intent even when a unidirectional sequence of intents is not naturally present. An artificial intent sequence within a chain of intent may be desirable for improving the advertising monetization. For example, an artificial unidirectional relationship may be imposed between a first intent closely associated with a highly monetized advertising category and a second intent that is associated with a less monetizeable advertising category. It may be desirable to utilize the relationship from the less monetizeable intent to the more monetizeable intent, while avoiding the reverse relationship. All the various chains of intent found in a plurality of actions may be stored in the chain-of-intent data store 222, which may be accessed by other components within the computer system architecture 200.

The intent-ontology data store 230 stores an intent ontology that defines a set of terms that describes the conceptual space associated finding relationships between intents. The intent ontology may define intents used within embodiments of the present invention. The intent ontology may store associations between actions and one or more intents. For example, entering a query "flowers" is an online action that may be mapped to an intent to research gardening, an intent to purchase a bouquet of flowers, or an intent to decorate, to name a few possible intents. Each of these intents may be part of one or more chains of intent. The intent-ontology data store 230 may be used by other components to map the actions to one or more of these intents and perform further analysis. The mapping may be based on semantics. The intents may be organized in an intent taxonomy that includes intent hierarchies. For example, a root intent may be an intent to make a purchase. Branches from the root may be an intent to purchase a car, an intent to purchase a house, and an intent to purchase jewelry. The individual intents may be described or defined within the intent ontology. Intents may be placed into classes based on subject matter or other criteria. The actions associated with intents may also be defined, described, and/or placed into classes. Possible consequences of actions, such as confirmation emails in response to purchasing an airline ticket, also may be included within the intent ontology. Consequences of actions are tracked to establish that actions induce responses, which in turn induce other actions.

Activity component 240 receives activities performed by a user that is presently online. The activity component 240 may actively monitor all inputs to a particular search engine or other websites to detect activities. In one embodiment, the activity component 240 evaluates the series of online actions associated with each user from which it is receiving input. The activity component 240 may sort, filter, or preprocess this information and pass it to the object-selection component 250. The activity component 240 may also receive offline activity such as purchase information provided by retailers or credit card companies.

The related-intent component 245 determines an intent that is related to the user's present intent. The related intent may be selected from a chain of intent of which the user's present intent is a part. In order to do this, the related-intent component 245 identifies the user's present intent from one or more currently observed activities. The user's present intent may be determined using the intent/action mappings stored within the intent-ontology data store 230 and a classifier. In one embodiment, a classifier that determines the present intent based on present actions is part of the related-intent component 245. The classifier may also be a separate component that is utilized by the related-intent component 245. In another embodiment, the present intent is determined by the action-intent mapping component 205 and communicated to the related-intent component 245. After identifying a present intent, a chain of intent containing the present intent is selected from the chain-of-intent data store 222. A related intent from the selected chain of intent is selected. In one embodiment, the chain of intent is selected from multiple chains of intent that include the user's present intent based on the lifestyle of the user. For example, a chain of intent related to purchasing a sports car could selected over a chain of intent related to purchasing a minivan if the lifestyle of the user indicates the user is a young adult without children. The related intent from the selected chain of intent may also be selected based on a lifestyle of the user.

The object-selection component 250 selects an online object associated with an intent that is related through a chain of intent to the current intent of the user. The object-selection component 250 may retrieve one or more objects from a data store that are associated with the selected intent (and possibly also the currently observed online activity, depending on the model used to indentify relationships between intents). Examples of online objects include query results, advertisements, and cookies describing advertising segments. An advertising segment is a category of advertising in which the user may be interested. The object-selection component 250 may select a cookie that describes an advertising segment associated with the related intent and upload it to the user's computer. Advertising entities may then use the cookie to select advertisements in which the user may be interested.

Figure 7:
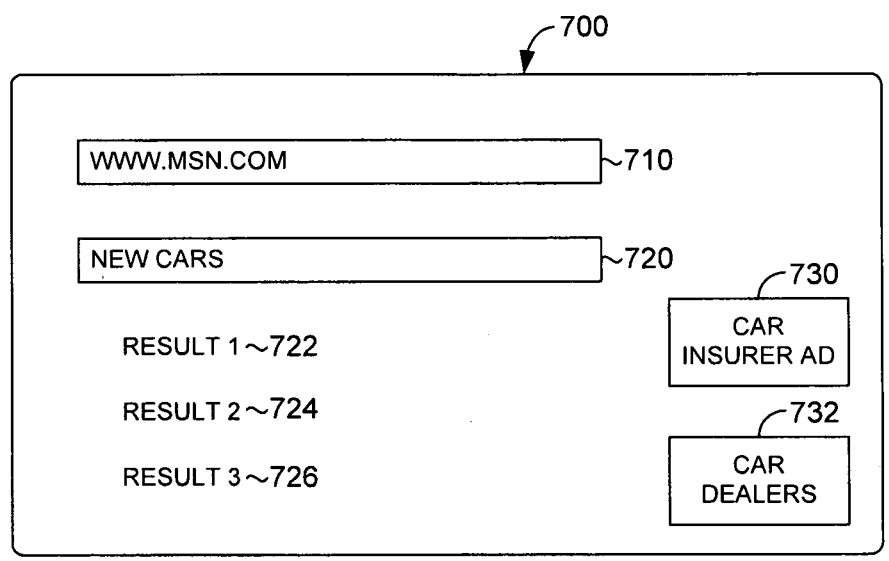
FIG. 7 is an illustrative user interface showing the display of an online object related through intent to the present intent manifest in the present online action in accordance with an embodiment of the invention.

The user-interface component 260 displays selected online objects in association with the content presently being viewed by the user. FIG. 7 shows an example of a user interface presenting online objects with the presently viewed subject matter. User interface 700 includes a navigation bar 710 and a search query input 720. Search results responsive to the search query "new cars" 721 are shown as result 1 722, result 2 724, and result 3 726. These items are part of the normal results generated by the search engine. Advertisement 730 and advertisement 732 are presented in response to determining an intent related to a present intent ascertained from submitting the search query "new cars" 721. For example, the advertisements could be related to the intent to buy car insurance, which may be a related to the present intent to buy or research new cars. Some selected-online objects, such as cookies, would not be displayed.

Figure 8:
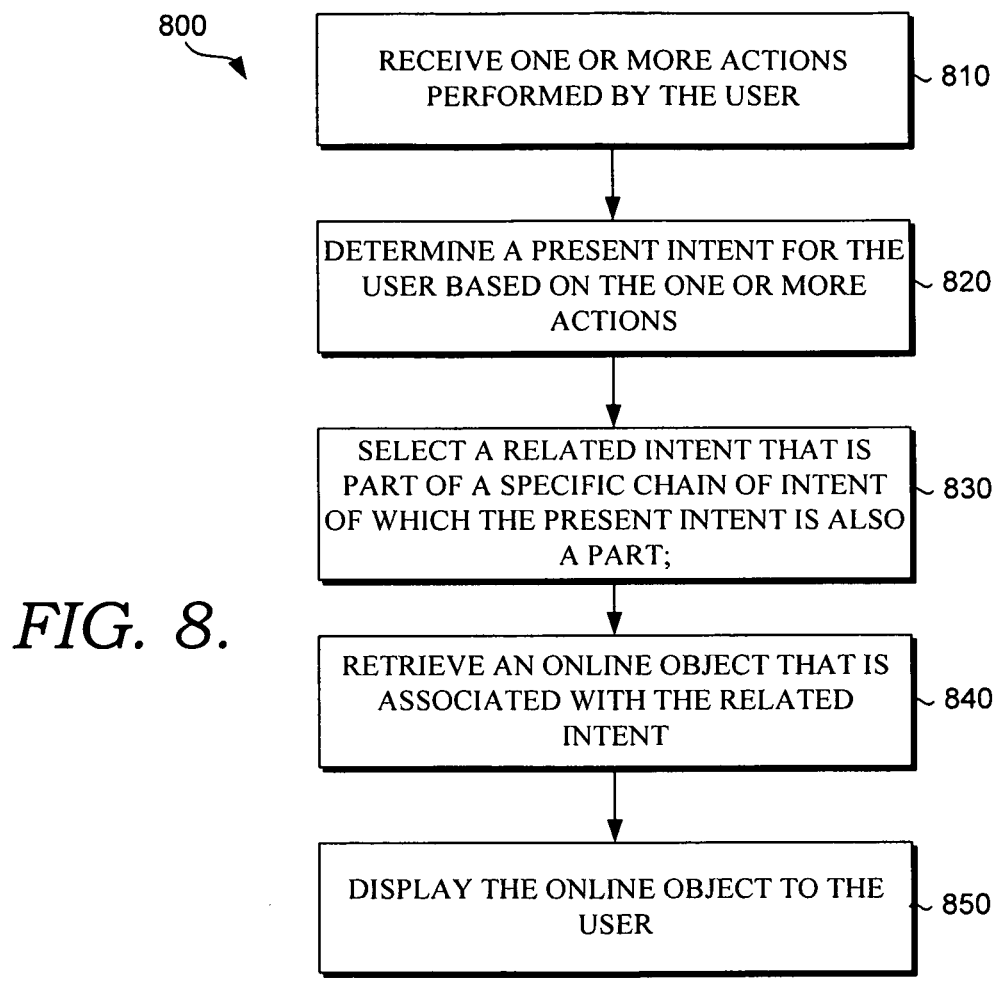
FIG. 8 is a flow diagram showing a method of determining an intent that is related to a present intent of the user manifested through one or more actions performed by the user in accordance with an embodiment of the invention.

Turning now to FIG. 8, a method of determining an intent that is related to a present intent of the user, wherein the present intent is manifested through one or more actions performed by the user is shown, in accordance with an embodiment of the invention. As explained previously, the online object may be one or more of an advertisement, web link, search result, or query assistance. At step 810, one or more actions performed by the user are received. The actions may be online actions or offline actions. The online actions may include one or more of navigating to a web page or submitting a query into a search interface. The offline actions in activity data store 220 may include making a purchase, taking a trip, watching a TV show, or downloading a movie The offline actions may be received from entities such as travel agents, cable companies, and online retailers. For example, a cable company may supply information indicating that a user watched a show on home improvements. This might support a present intent to research home improvements. Other online and offline actions may also be received.

At step 820, a present intent for the user is determined based on the one or more online actions. The present intent may be determined by mapping the one or more online actions to one of a plurality of intents within an intent ontology. A machine learning classifier may be trained and then utilized to determine the present intent based on the one or more online actions. Examples of suitable classifiers include SVM and logistic regression classifiers. Other types of classifiers may also be utilized. As additional actions are received, the present intent may be changed to better reflect the present intent indicated by the additional actions. For example, a present intent may be selected based on receiving a single action. A different present intent may be selected when additional actions clarify the user's intent. As explained previously, the intent ontology may define associations between user actions and intents. The intents may form an intent chain that includes at least two or more intents that are related. A single intent may be related to one or more other intents in a unidirectional chain of intent or bidirectional chain of intent.

The chain of intents may be chronological or non-chronological. An intent chain that includes chronological intents includes one or more unidirectional relationships. In other words, the first intent in the intent chain is related to the second intent and the second intent is related to the third intent, but the third intent may not be related to the second or first intent. If the present intent is the first intent, then the second or third intent may be related. If the present intent is the third intent, then the first and second intents may not be related in this particular chain of intent that is being used as an example. The third intent may be related to other intents through a separate chain of intent. A single intent may be part of multiple chains of intent.

At step 830, a related intent that is part of a specific intent chain of intent that the present intent is part of is selected. When a present intent is part of multiple intent chains, various criteria may be used to select the most relevant chain of intent. For example, if the present intent is the third intent in a uni-directional intent chain, then that intent chain may not be desirable to choose because there is no effective related intent for the present intent. Criteria such as the most monetizeable chain of intent, or relevant chain of intent based on other factors such as the user's lifestyle may be utilized to select a chain of intent from which the related intent is selected. As described previously, as additional user actions are received, the related intent may be updated as the present intent and/or the specific chain of intent is updated.

At step 840, the online object that is associated with the related intent is retrieved. The online object is related to the related intent but not the present intent in an embodiment of the invention. An online object that is associated with the related intent may be retrieved by mapping the related intent to online objects associated with the related intent. In one embodiment, each of the intents is associated with one or more key words which are fed into an advertising selection algorithm that uses key words to select appropriate advertisements. Other methods of retrieving online objects are also possible. In one embodiment, the online object is a cookie that communicates an advertising segment associated with the related intent.

At step 850, the online object is displayed to the user on a client device. Various filters may be used to select the online object to tailor it to a particular user. For example, the user may be categorized into a lifestyle category based on information known about the user. The information may be current activities or past activities. Further, the lifestyle category may be updated as additional information about the user is learned. A lifestyle category describes a person's interests, hobbies, and activities. The online object may be determined in part using a lifestyle filter. For example, a user in the lifestyle category "cowboy" may be shown cowboy boots in response to an intention to purchase boots in contrast to an advertisement for hiking boots or an outdoors outfitter that might also fit the present intent.

Figure 9:
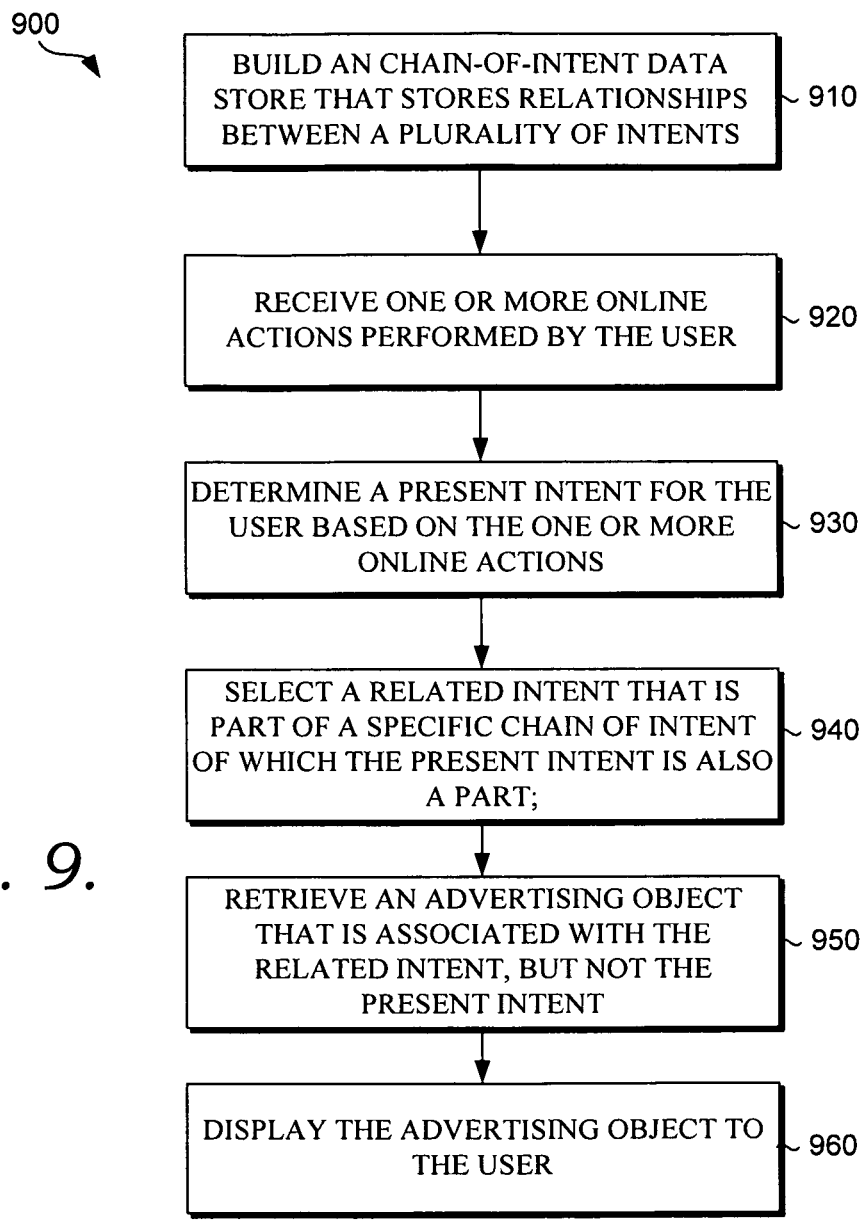
FIG. 9 is a flow diagram showing a method for presenting advertising objects that are related through an intent chain to an intent ascertained from observed online actions performed by a user in accordance with an embodiment of the invention.

Turning now to FIG. 9, method 900 for presenting advertising objects that are related through an intent chain to an intent ascertained from observed online actions performed by a user is shown, in accordance with an embodiment of the invention. At step 910, a chain-of-intent data store that stores relationships between a plurality of intents is built. The intents within chain-of-intent data store may be related through a chain of intent to at least one other intent. Building a chain-of-intent data store and the relationships between the intents has been described previously with reference to FIG. 2.

At step 920, the online actions presently performed by the user are received. Examples of online actions include navigating to websites, making purchases, and submitting online queries. At step 930, the user is determined to have a present intent based on the one or more online actions. The present intent may be determined by mapping the one or more online actions to an intent within an intent ontology. As explained previously, a classifier may be used to determine a present intent based on present actions. A related intent that is part of a specific chain of intent with the present intent is retrieved. As described previously, the specific chain of intent is part of the chain-of-intent data store. At step 950, an advertising object that is associated with the related intent is retrieved. The advertising object is associated with the related intent but not the present intent. At step 960, the advertising object is displayed to the user. Displaying an advertising object to the user has been described previously, for example, with reference to FIG. 7.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-storage media embedded with computer-executable instructions, the embedded computer-executable instructions are executed by at least one processor for performing a method of determining an intent that is related to a present intent of a user, the method comprising:
   receiving one or more actions performed by the user, wherein the one or more actions include at least one action toward a goal;
   determining, for the user, a present intent, which is an object logically accomplished by performing an online action, based on the received one or more performed actions, wherein the determined present intent is one of a plurality of intents within an intent ontology that defines relationships between intents and actions, and wherein each of the plurality of intents is associated with at least one other intent through a chain of intent, wherein the chain of intent includes a chronological sequence of two or more related intents, wherein the chain of intent has a chronological relationship based on a temporal progression of intents;
   selecting a related intent that is part of a corresponding chain of intent that includes the determined present intent; and
   retrieving an online object that is associated with the related intent in anticipation to the related intent.

2. The one or more computer-storage media of claim 1, wherein the two or more related intents in the chain of intent are uni-directional meaning that a first intent is related to a second intent and the second intent is not related to the first intent.

3. The one or more computer-storage media of claim 1, wherein the corresponding chain of intent comprises a sequence of three intents that are related uni-directionally, and wherein the related intent is a third intent in the sequence and the present intent is a first intent in the sequence.

4. The one or more computer-storage media of claim 1, wherein the method further includes:
    categorizing the user into a lifestyle category based on information known about the user, wherein the lifestyle category describes a user's interests, hobbies, and activities; and
    wherein the corresponding chain of intent is selected from among at least two chains of intent that included the present intent to find a best match within the lifestyle category.

5. The one or more computer-storage media of claim 1, wherein the method further includes:
    categorizing the user into a lifestyle category based on information known about the user, wherein the lifestyle category describes a user's interests, hobbies, and activities; and
    wherein the online object is retrieved based on the related intent and a best match within the lifestyle category.

6. The one or more computer-storage media of claim 1, wherein the chronological sequence is determined by a statistical analysis of online action patterns generated by multiple users.

7. A system, for determining an intent that is related to a present intent of a user, the system comprising:
    at least one processor;
    one or more computer-storage media embedded with computer-executable instructions, the embedded computer-executable instructions are executed by the at least one processor to:
    receive one or more actions performed by the user, wherein the one or more actions include at least one action toward a goal;
    determine, for the user, a present intent, which is an object logically accomplished by performing an online action, based on the received one or more performed actions, wherein the determined present intent is one of a plurality of intents within an intent ontology that defines relationships between intents and actions, and wherein each of the plurality of intents is associated with at least one other intent through a chain of intent, wherein the chain of intent includes a chronological sequence of two or more related intents, wherein the chain of intent has a chronological relationship based on a temporal progression of intents;
    select a related intent that is part of a corresponding chain of intent that includes the determined present intent; and
    retrieve an online object that is associated with the related intent in anticipation to the related intent.

8. The system of claim 7, wherein the two or more related intents in the chain of intent are bi-directional meaning that a first intent is related to a second intent and the second intent is related to the first intent.

9. The system of claim 7, wherein the embedded computer-executable instructions are further executed by the at least one processor to:
    categorize the user into a lifestyle category based on information known about the user, wherein the lifestyle category describes a user's interests, hobbies, and activities; and
    wherein the corresponding chain of intent is selected from among at least two chains of intent that included the present intent to find a best match within the lifestyle category.

10. The system of claim 9, wherein the online object is a cookie that communicates an advertising segment associated with the related intent, including a description of the advertising segment that may be used by advertisers to select an advertisement associated with the advertising segment.

11. The system of claim 9, wherein the online object is retrieved based on the related intent and a lifestyle category of the user that is determined based on information known about the user, wherein the lifestyle category describes the user's interests, hobbies, and activities.

12. The system of claim 7, wherein the embedded computer-executable instructions are further executed by the at least one processor to:
    categorize the user into a lifestyle category based on information known about the user, wherein the lifestyle category describes a user's interests, hobbies, and activities; and
    wherein the online object is retrieved based on the related intent and a best match within the lifestyle category.

13. The system of claim 7, wherein the chronological sequence is determined by a statistical analysis of online action patterns generated by multiple users.

14. A computerized method for determining an intent that is related to a present intent of a user, the method comprising:
    receiving, by a computer device, one or more actions performed by the user, wherein the one or more actions include at least one action toward a goal;
    determining, by the computer device for the user, a present intent, which is an object logically accomplished by performing an online action, based on the received one or more performed actions, wherein the determined present intent is one of a plurality of intents within an intent ontology that defines relationships between intents and actions, and wherein each of the plurality of intents is associated with at least one other intent through a chain of intent, wherein the chain of intent includes a chronological sequence of two or more related intents, wherein the chain of intent has a chronological relationship based on a temporal progression of intents;
    selecting, by the computer device, a related intent that is part of a corresponding chain of intent that includes the determined present intent; and
    retrieving, by the computer device, an online object that is associated with the related intent in anticipation to the related intent.

15. The computerized method of claim 14, wherein two or more related intents in the chain of intent are uni-directional meaning that a first intent is related to a second intent and the second intent is not related to the first intent.

16. The computerized method of claim 14, wherein relationships within the chain-of-intent data store are determined using Association Rule Mining algorithm, wherein prior intents and actions have an influence on the next possible intent.

17. The computerized method of claim 14, wherein the corresponding chain of intent comprises a sequence of three intents that are related uni-directionally, and wherein the related intent is a third intent in the sequence and the present intent is a first intent in the sequence.

18. The computerized method of claim 14, wherein the present intent and the related intent within the corresponding chain of intent are related to each other by association with a common situation.

19. The computerized method of claim 14, wherein the method further includes:
    receiving additional online actions performed by the user;
    determining that the user has a different intent based on the one or more actions and the additional online actions;

retrieving a new related intent that is part of a different chain of intent, wherein the different intent is also a part;

retrieving a new online object that is associated with the new related intent, but not the different intent; and displaying the new online object to the user.

20. The computerized method of claim 14, wherein the chronological sequence is determined by a statistical analysis of online action patterns generated by multiple users.

* * * * *